(12) United States Patent
Sun et al.

(10) Patent No.: US 7,050,500 B2
(45) Date of Patent: *May 23, 2006

(54) METHOD AND APPARATUS FOR MOTION VECTOR CODING WITH GLOBAL MOTION PARAMETERS

(75) Inventors: Shijun Sun, Vancouver, WA (US); Shawmin Lei, Camas, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 375 days.

This patent is subject to a terminal disclaimer.

(21) Appl. No.: 09/938,337

(22) Filed: Aug. 23, 2001

(65) Prior Publication Data

US 2003/0043912 A1 Mar. 6, 2003

(51) Int. Cl.
*H04N 7/12* (2006.01)

(52) U.S. Cl. .................................. 375/240.16

(58) Field of Classification Search ............... 375/240, 375/240.12–240.17, 240.24, 240.27; 382/236; H04N 7/12
See application file for complete search history.

(56) References Cited

U.S. PATENT DOCUMENTS

| 5,430,480 | A | | 7/1995 | Allen et al. | |
|---|---|---|---|---|---|
| 5,440,345 | A | * | 8/1995 | Shimoda | 375/240.14 |
| 5,473,379 | A | | 12/1995 | Horne | |
| 5,657,087 | A | * | 8/1997 | Jeong et al. | 375/240.16 |
| 5,844,613 | A | | 12/1998 | Chaddha | |
| 5,995,095 | A | | 11/1999 | Ratakonda | |
| 6,008,852 | A | | 12/1999 | Nakaya | |
| 6,023,300 | A | * | 2/2000 | Han et al. | 375/240.16 |
| 6,037,988 | A | | 3/2000 | Gu et al. | |
| 6,055,330 | A | * | 4/2000 | Eleftheriadis et al. | 382/236 |
| 6,178,202 | B1 | | 1/2001 | Nakaya | 375/240.16 |
| 6,205,178 | B1 | | 3/2001 | Suzuki et al. | 375/240.15 |
| 6,205,260 | B1 | | 3/2001 | Crinon et al. | 382/284 |
| 6,256,343 | B1 | * | 7/2001 | Suzuki | 375/240 |
| 6,310,920 | B1 | * | 10/2001 | Ogawa | 375/240.17 |
| 2001/0002922 | A1 | * | 6/2001 | Hayashi | 375/240.16 |
| 2002/0118761 | A1 | * | 8/2002 | Lee | 375/240.27 |
| 2003/0174776 | A1 | * | 9/2003 | Shimizu et al. | 375/240.16 |

FOREIGN PATENT DOCUMENTS

| JP | 4003595 | 1/1992 |
|---|---|---|
| JP | 6245201 | 9/1994 |
| JP | 9252470 | 9/1997 |
| JP | 10136375 | 5/1998 |
| JP | 10290463 | 10/1998 |

OTHER PUBLICATIONS

Dufaux and Konard, "Efficient, Robust, and Fast Global Motion Estimation for Video Coding," IEEE Transactions on Image Processing, vol. 9, pp. 497-501, copyright 2000.

(Continued)

*Primary Examiner*—Richard Lee
(74) *Attorney, Agent, or Firm*—Marger Johnson & McCollom, P.C.

(57) ABSTRACT

A global motion vector coding scheme is used for coding or decoding an image. Global motion parameters are associated with a current image frame. Local motion vectors are derived from the global motion parameters for individual macroblocks in the current image frame. The local motion vectors are then used to identify reference blocks in a current reference frame. The reference blocks are then used to either encode or decode the macroblocks in the current image frame.

29 Claims, 9 Drawing Sheets

OTHER PUBLICATIONS

"Information Technology—Generic Coding of Audio Visual Objects—Part 2: Visual", ISO/IEC Copyright 1998, pp. 159-164.

International Telecommunication Union, "Transmission of Non-Telephone Signals—Video Coding for Low Bit Rate Communication", Jan. 27, 1998, pp. 111-121.

Demin Wang and Limin Wang, "Global Motion Parameters Estimation Using a Fast and Robust Algorithm", IEEE Transactions on Circuits and Systems for Video Technology, vol. 7, No. 5, Oct. 1997, pp. 823-826.

Gisle Bjontegaard, "H.26L Test Model Long Term No. 8 (TML-8) draft0", document VCEG-Nxx, ITU-T Video Coding Experts Group (VCEG) Meeting, Jun. 28, 2001, pp. 1-46.

Gisle Bjontegaard, "Calculation of Average PSNR Differences Between RD-curves", document VCEG-M33, ITU-T Video Coding Experts Group (VCEG) Meeting, Austin, TX, Apr. 2-4, 2001, pp. 1-4.

Gisle Bjontegaard, "Recommended Simulation Conditions for H.26L", document VCEG-M75, ITU-T Video Coding Experts Group (VCEG) Meeting, Austin, TX. Apr. 2-4, 2001, pp. 1-2.

Shijun Sun and Shawmin Lei, "Motion Vector Coding with Global Motion Parameters", document VCEG-Nx2, ITU-T Video Coding Experts Group (VCEG) Meeting, Sep. 4-7, 2001, pp. 1-10.

* cited by examiner

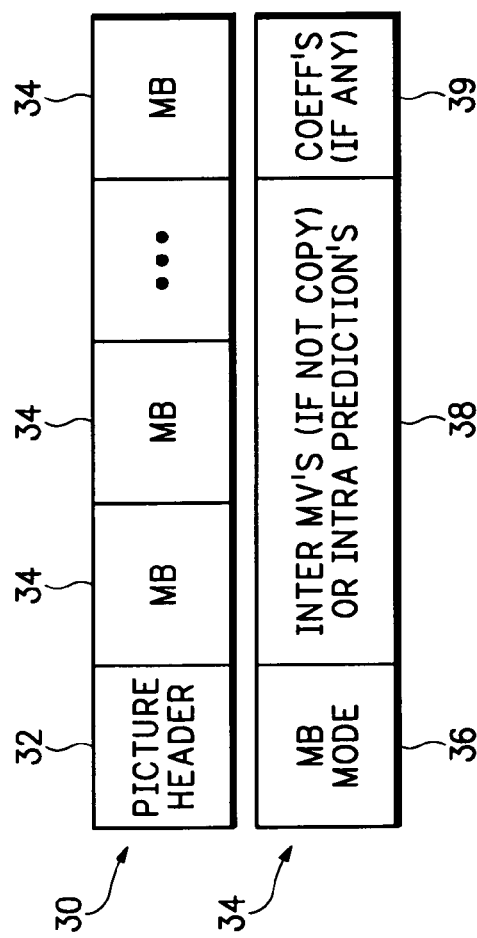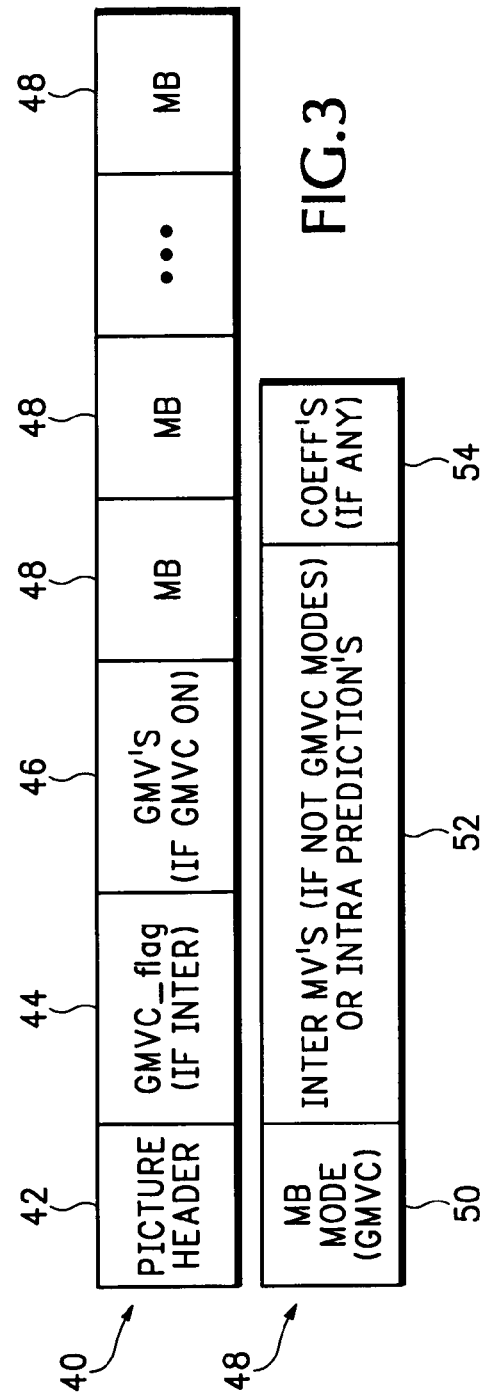

TABLE 1
CODEWORD NUMBER OF GMVC_flag

| CODE NUMBER | GMVC_flag | COMMENT |
|---|---|---|
| 0 | 0 | GMVC OFF |
| 1 | 1 | GMVC ON |

FIG.4

TABLE 2
CODEWORD NUMBER OF MB MODES

| CODE NUMBER | GMVC OFF | GMVC ON | COMMENT |
|---|---|---|---|
| X | COPY | GMVC COPY | GMVC MODES |
| 0 | 16X16 | GMVC_16 | NON-GMVC MODES |
| 1 | 16X8 | 16X16 | NON-GMVC MODES |
| 2 | 8X16 | 16X8 | NON-GMVC MODES |
| 3 | 8X8 | 8X16 | NON-GMVC MODES |
| 4 | 8X4 | 8X8 | NON-GMVC MODES |
| 5 | 4X8 | 8X4 | NON-GMVC MODES |
| 6 | 4X4 | 4X8 | NON-GMVC MODES |
| 7 | INTRA 4X4 | 4X4 | NON-GMVC MODES |
| 8 | 0,0,0 | INTRA 4X4 | NON-GMVC MODES |
| ... | ... | ... | |

FIG.5

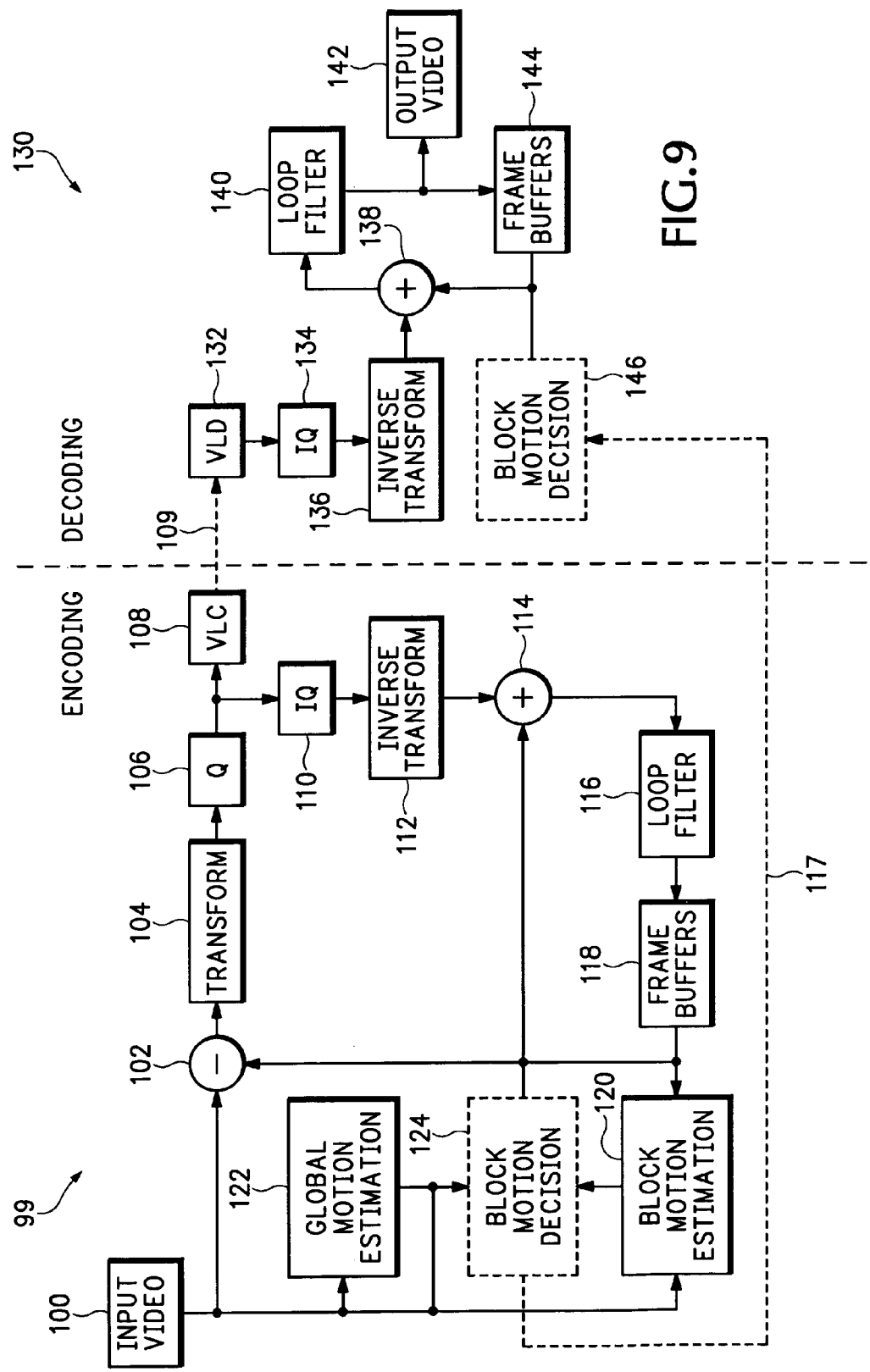

| SEQUENCES | NUMBER OF FRAMES | QP | PSNR(Y) (TML8) | bitrate (TML8) | PSNR(Y) (GMVC) | bitrate (GMVC) | GMVC AVERAGE bitsavings (avsnr) | GMVC AVERAGE dB GAIN (avsnr) |
|---|---|---|---|---|---|---|---|---|
| container_qcif | 100 | 16 | 36.012 | 26841 | 36.072 | 26973 | 0.41% | 0.017 |
| | 100 | 20 | 33.315 | 14686 | 33.374 | 14982 | | |
| | 100 | 24 | 39.496 | 8872 | 30.625 | 8992 | | |
| | 100 | 28 | 27.72 | 5501 | 27.89 | 5546 | | |
| news_qcif | 100 | 16 | 36.748 | 50387 | 36.771 | 50306 | 0.32% | 0.019 |
| | 100 | 20 | 33.773 | 30616 | 33.807 | 30610 | | |
| | 100 | 24 | 30.807 | 18393 | 30.878 | 18571 | | |
| | 100 | 28 | 27.912 | 11138 | 27.92 | 11217 | | |
| foreman_qcif | 100 | 16 | 36.03 | 77341 | 36.015 | 76953 | 3.75% | 0.197 |
| | 100 | 20 | 33.312 | 47049 | 33.254 | 45815 | | |
| | 100 | 24 | 30.759 | 29654 | 30.691 | 27729 | | |
| | 100 | 28 | 28.123 | 19002 | 27.987 | 16829 | | |
| silent_qcif | 150 | 16 | 35.799 | 62703 | 35.803 | 62584 | 1.54% | 0.075 |
| | 150 | 20 | 33.067 | 36789 | 33.105 | 36700 | | |
| | 150 | 24 | 30.446 | 21462 | 30.528 | 21341 | | |
| | 150 | 28 | 27.94 | 12389 | 28.027 | 12325 | | |

|  |  |  |  | FROM FIG.10A | | |  |
|---|---|---|---|---|---|---|---|
| paris_cif | 150 | 16 | 35.607 | 350219 | 35.627 | 348976 | 0.73% | 0.037 |
|  | 150 | 20 | 32.541 | 202010 | 32.576 | 201485 | | |
|  | 150 | 24 | 29.636 | 112599 | 29.65 | 112559 | | |
|  | 150 | 28 | 26.719 | 63113 | 26.754 | 62710 | | |
| mobile_cif | 300 | 16 | 34.009 | 1658660 | 33.986 | 1657004 | 0.64% | 0.028 |
|  | 300 | 20 | 30.738 | 838637 | 30.684 | 833798 | | |
|  | 300 | 24 | 27.817 | 423358 | 27.672 | 406809 | | |
|  | 300 | 28 | 25.093 | 252598 | 24.839 | 226740 | | |
| tempete_cif | 260 | 16 | 34.95 | 1275478 | 34.945 | 1276031 | 1.29% | 0.053 |
|  | 260 | 20 | 31.931 | 625722 | 31.887 | 619544 | | |
|  | 260 | 24 | 29.217 | 313318 | 29.134 | 301817 | | |
|  | 260 | 28 | 26.557 | 176451 | 26.472 | 162093 | | |
| coast_cif | 300 | 16 | 34.36 | 1289113 | 34.341 | 1265484 | 8.23% | 0.28 |
|  | 300 | 20 | 31.491 | 649562 | 31.457 | 616242 | | |
|  | 300 | 24 | 28.874 | 307248 | 28.854 | 270744 | | |
|  | 300 | 28 | 26.548 | 144230 | 26.606 | 116146 | | |
| AVERAGE | | | | | | | 2.11% | 0.08825 |

COMPARISON OF TML-8 AND THE PROPOSED GMVC

FIG.10B

METHOD AND APPARATUS FOR MOTION VECTOR CODING WITH GLOBAL MOTION PARAMETERS

BACKGROUND

Global motion compensation (GMC) techniques, such as the "sprite" coding technique used in MPEG-4 and a "reference picture resampling" technique in Annex P of H.263+, have been used in advanced video coding. These techniques usually follow similar steps.

Referring to FIG. 1, for each current image frame 12, a reference image 14 is derived based on global motion vectors 16. The global motion vectors 16 take into account global image changes between the previous image frame 18 and the current image frame 12. For example, the global motion vectors 16 account for changes in camera angle, camera zooming, etc. that have occurred between frame 18 and 12. The current image 12 is then coded and decoded using the reference frame 14. For example, the portion of an image in MacroBlock (MB) 20 may be exactly the same in the associated macroblock 22 in reference image 14. If this is the case, then the image information in macroblock 20 does not have to be encoded. The image data in block 22 in reference frame 14 can be copied into macroblock 20 of current image 12.

These GMC techniques have shown their advantages in low-bit-rate video coding by reducing the bit rate and enhancing the visual quality. However, GMC increases computational complexity. For each current image frame 12, the reference image 14 has to be reconstructed or updated in both the encoder and decoder based on the global motion vector 16. This can be especially expensive on the decoder side in terms of computation and memory space.

In other situations, an object may change position from the previous image 18 to the current image 12. A local motion vector 26 identifies where the image information in macroblock 20 has moved from the previous image frame 18. The only information that has to be encoded for macroblock 20 is the local motion vector 26 and any residual differences between the image information in macroblock 20 and the image information in macroblock 28. This local motion vector video coding technique is less computationally complex than GMC but typically requires more bits since the local motion vectors 26 have to be separately encoded and then transmitted or stored for each macroblock 20 in image 12.

The present invention addresses this and other problems associated with the prior art.

SUMMARY OF THE INVENTION

A global motion vector coding scheme is used for coding or decoding an image. Global motion parameters are associated with a current image frame. Local motion vectors are derived from the global motion parameters for individual macroblocks in the current image frame. The local motion vectors are then used to identify reference blocks in a current reference frame. The reference blocks are then used to either encode or decode the macroblocks in the current image frame.

BRIEF DESCRIPTION OF THE DRAWINGS

FIG. 2 is a diagram of a prior art syntax used for an encoded bit stream.
FIG. 3 is a diagram of a syntax used for Global Motion Vector Coding (GMVC).
FIGS. 4 and 5 are tables of code words used for GMVC.
FIG. 9 is a block diagram showing an encoder and decoder that perform GMVC.
FIG. 10 is a table showing the results of GMVC.

DETAILED DESCRIPTION

Figure 1:
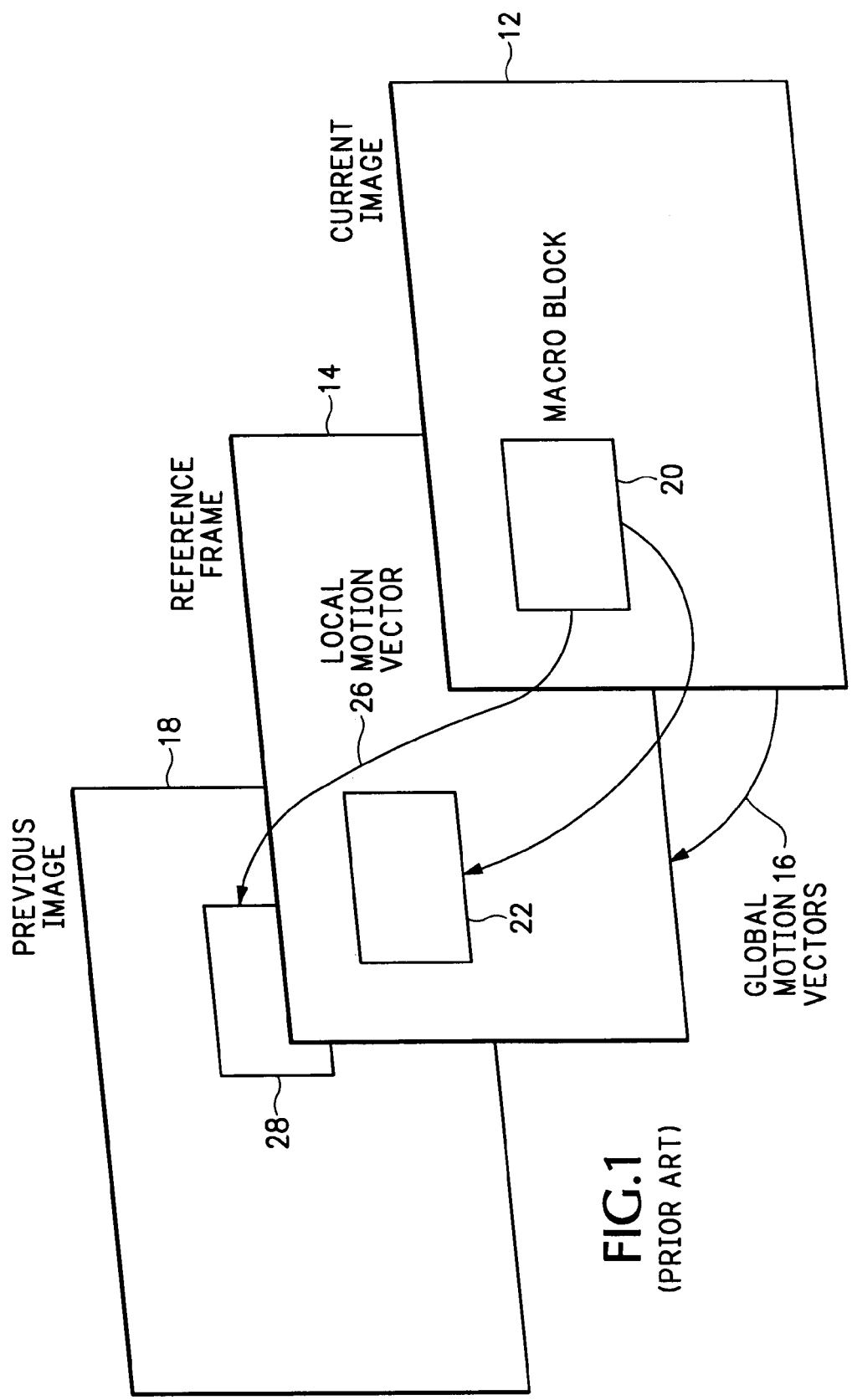
FIG. 1 is a diagram showing a prior art encoding syntax.

Global motion parameters are used for local motion vector coding to eliminate the need for reconstructing a reference picture in either the encoder or decoder.

Motion Vector Coding with Global Motion Parameters

FIG. 2 illustrates a prior art bit syntax used for the current TML video codec. The TML video codec is described in a document by Gisle Bjontegaard, entitled: "H.26L Test Model Long Term Number 8 (TML-8) draft0," ITU-T Video Coding Experts Group (VCEG) Meeting, Jun. 28, 2001.

Referring to FIG. 2, a bit stream 30 includes a coded picture header 32 followed by the coding of all image Macroblocks 34 (MBs) in an image frame. Each individual MB 34 is coded and includes an MB mode 36, the necessary local motion vector for Inter-frame prediction (Inter MB) or intra-frame prediction (Intra MB). Inter-frame prediction refers to using a macroblock from a previously derived reference frame for encoding and decoding the MB. Intra-frame prediction refers to using a macroblock in the same image frame for encoding and decoding. The individual MBs 34 are followed by transform coefficients 39 for image residuals.

FIG. 3 shows a coding syntax used for GMVC (Global Motion Vector Coding). A coded GMVC bit stream 40 includes the picture headers 42 similar to the picture headers 32 in FIG. 2. For each INTER frame, a GMVC_flag 44 is added right after the picture header 42 to signal if GMVC is on or off for the current frame. The codeword numbers for the GMVC_flag 44 are listed in Table 1 of FIG. 4. If GMVC is off, then the remainder of the syntax for the bit stream 40 will be similar to the bit stream syntax shown in FIG. 2. Comparing the original TML syntax in FIG. 2 with the GMVC syntax shown in FIG. 3, only one extra bit is needed per inter frame for the GMVC_flag 44.

If GMVC is on, global motion vectors (GMV's) 46 are coded after the GMVC_flag 44 followed by MBs 48. Each MB 48 includes a MB mode 50 that identifies the coding mode used in the MB 48. If a conventional coding mode is identified, then a motion vector 52 is encoded for the MB similar to FIG. 2.

If the MB mode 50 is determined to be one of the GMVC modes, no motion vector is coded since the motion vectors for all sub blocks in that MB 48 are derived from the GMV's 46 through bilinear interpolation.

Table 2 in FIG. 5 lists the codeword values for the different MB modes 50 used in the GMVC syntax 40 shown in FIG. 3. The GMVC modes identify the MB sizes used to encode the image. For example, when the GMVC flag 44 is off, and the MB mode has a value of 3, local motion vectors are encoded for 8×8 pixel MBs followed by any residuals

54. If the GMVC flag 44 is on and the MB mode is x, then a GMVC copy is indicated and no local motion vectors or residuals are encoded for the macroblock. The symbol "x" refers to the COPY or GMVC_COPY not having to be coded explicitly. For example, run length coding can be used to signal the COPY or GMVC_COPY. If the GMVC flag 44 is on and the MB mode is zero, then no local motion vectors are encoded and only residuals are encoded for the macroblock.

Motion Vector Calculation

Figure 6:
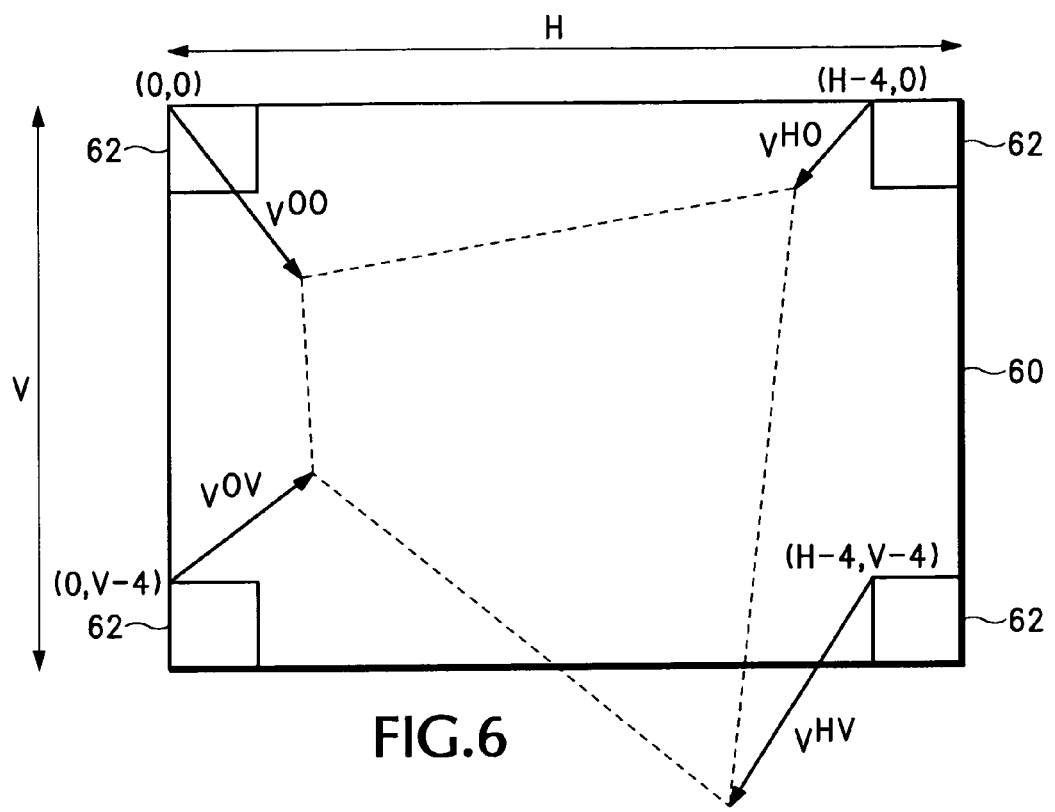
FIG. 6 is a diagram showing global motion vectors used for GMVC.

Referring to FIG. 6, assume an image frame 60 has a size H×V. The motion vectors $\underline{v}^{00}$, $\underline{v}^{H0}$, $\underline{v}^{0V}$, and $\underline{v}^{HV}$ are used for bilinear motion vector interpolation and represent the motion vectors of four 4×4 subblocks at the four corners (0,0), (H–4, 0), (0, V–4), and (H–4, V–4), of the frame 60, respectively. The number "4" is one example that uses a 4×4 pixel subblock size. However, the value can change according to the subblock size. For example, for a 8×8 subblock size, the motion vectors are located at four corners (0,0), (H–8), (0,V–8), and (H–8, V–8). The motion vector of a subblock with its upper-left pixel at (x, y) is derived as $$\underline{v}(x, y) = \underline{r}^0 + \left(\frac{x}{H-4}\right)\underline{r}^x + \left(\frac{y}{V-4}\right)\underline{r}^y + \left(\frac{x}{H-4}\right)\left(\frac{y}{V-4}\right)\underline{r}^{xy} \quad (1)$$

where $\underline{r}^0$, $\underline{r}^x$, $\underline{r}^y$, and $\underline{r}^{xy}$ are defined as the following
$\underline{r}^0 = \underline{v}^{00}$
$\underline{r}^x = \underline{v}^{H0} - \underline{v}^{00}$
$\underline{r}^y = \underline{v}^{0V} - \underline{v}^{00}$
$\underline{r}^{xy} = \underline{v}^{00} - \underline{v}^{H0} - V^{0V} + \underline{v}^{HV}$ The resolution of the local motion vectors can vary. In one example, the local motion vectors are represented in ¼ pixels. So a motion vector value of 1 means ¼ pixel and a motion vector of 4 means 1 pixel. To prevent mismatch during encoding/decoding, the output of Eq. (1) may be rounded to the nearest integer or rounded up when the fraction is exactly ½. For easy implementation, Eq. (1) can be implemented as follows:

$$\underline{v}(x, y) = \text{round}\left[\frac{\underline{r}^0(H-4)(V-4) + x(V-4)\underline{r}^x + y(H-4)\underline{r}^y + xy\underline{r}^{xy}}{(H-4)(L-4)}\right] \quad (2)$$

If the GMVC_flag 44 is set to "on" for a certain image frame, the horizontal and vertical components of $\underline{r}^0$, $\underline{r}^x$, $\underline{r}^y$, and $\underline{r}^{xy}$ are coded in the global motion vector parameters 46 right after the GMVC_flag 44, as illustrated in FIG. 3. The codebook for the GMV's can be chosen to be similar to codebooks used for other encoding schemes, such as the Motion Vector Difference (MVD). The MVD is the difference between a local motion vector (MV) and a local motion vector prediction (MVP), i.e., MV=MVP+MVD. The denominator (H–4) (L–4) in Eq. 2 is a constant. Once the frame size is determined, the division can be easily replaced by a multiplication and then a shift. Therefore, the computation requirement on the decoder side is minor.

Figure 7:
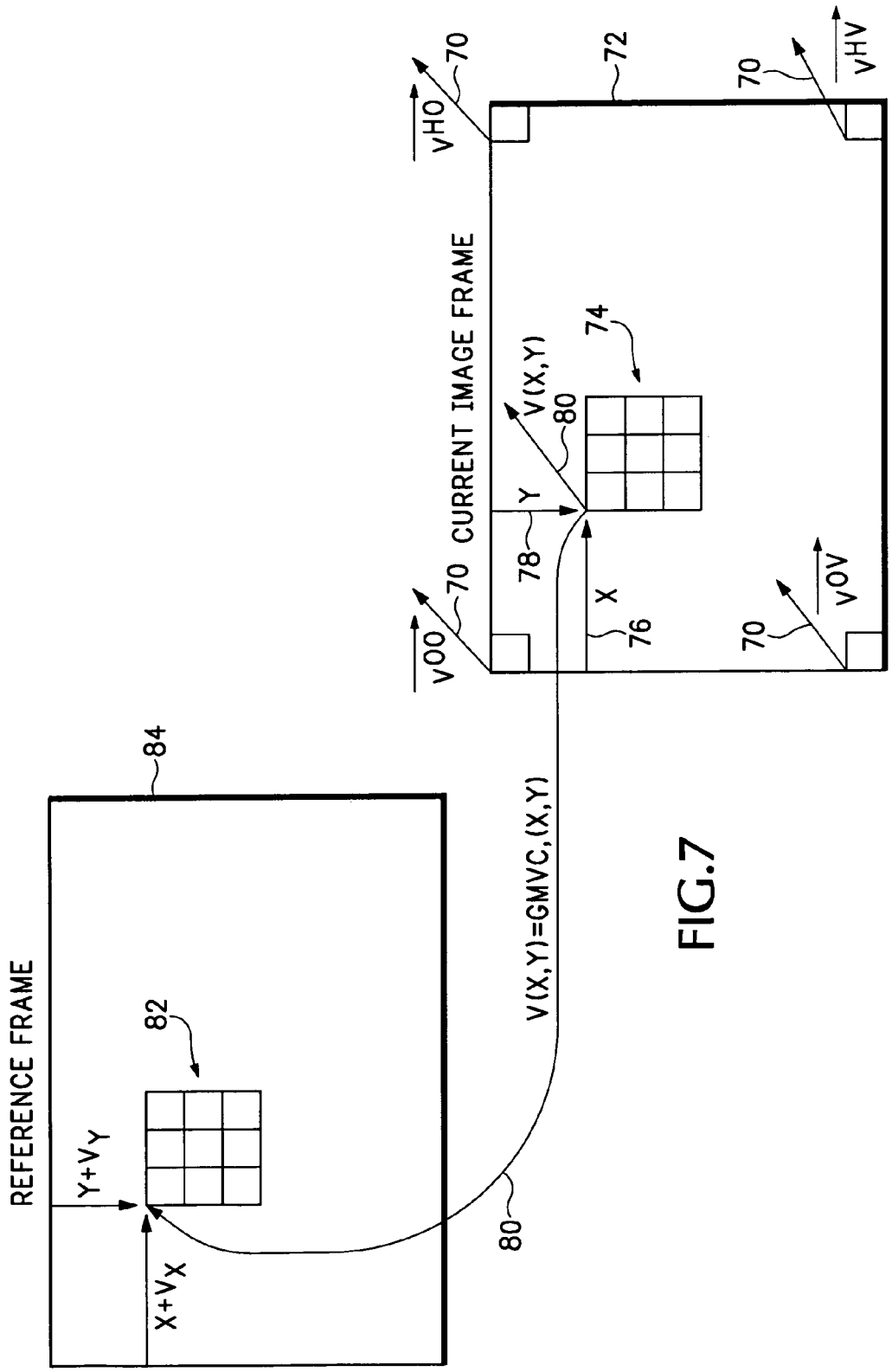
FIG. 7 is a diagram showing how local motion vectors are used to reconstruct Macroblocks (MBs) during GMVC.

Referring to FIG. 7, the motion vectors for each MB in a GMVC mode image frame are derived using Eq. (1). For example, four global motion vectors 70 are associated with the four corners of a current image frame 72. The MB 74 is currently being decoded. The MB mode 50 (FIG. 3) identifies MB 74 as GMVC encoded. Accordingly, the decoder identifies the x pixel position 76 and the y pixel position 78 for the upper left hand corner of MB 74. The x and y pixel positions are then used along with the global motion vectors 70 as previously described in EQ. 1 to generate a local motion vector 80.

The local motion vector 80 points to a reference MB 82 in a reference frame 84. If the GMVC code for MB 74 indicates a GMVC copy (FIG. 5), then the contents of reference MB 82 are copied into the MB 74. If the GMVC code for MB 74 is not copy, then residuals exist in the coded bit stream for the MB 74. The decoder adds the residuals to the reference MB 82 to derive the image values for MB 74.

Figure 8:
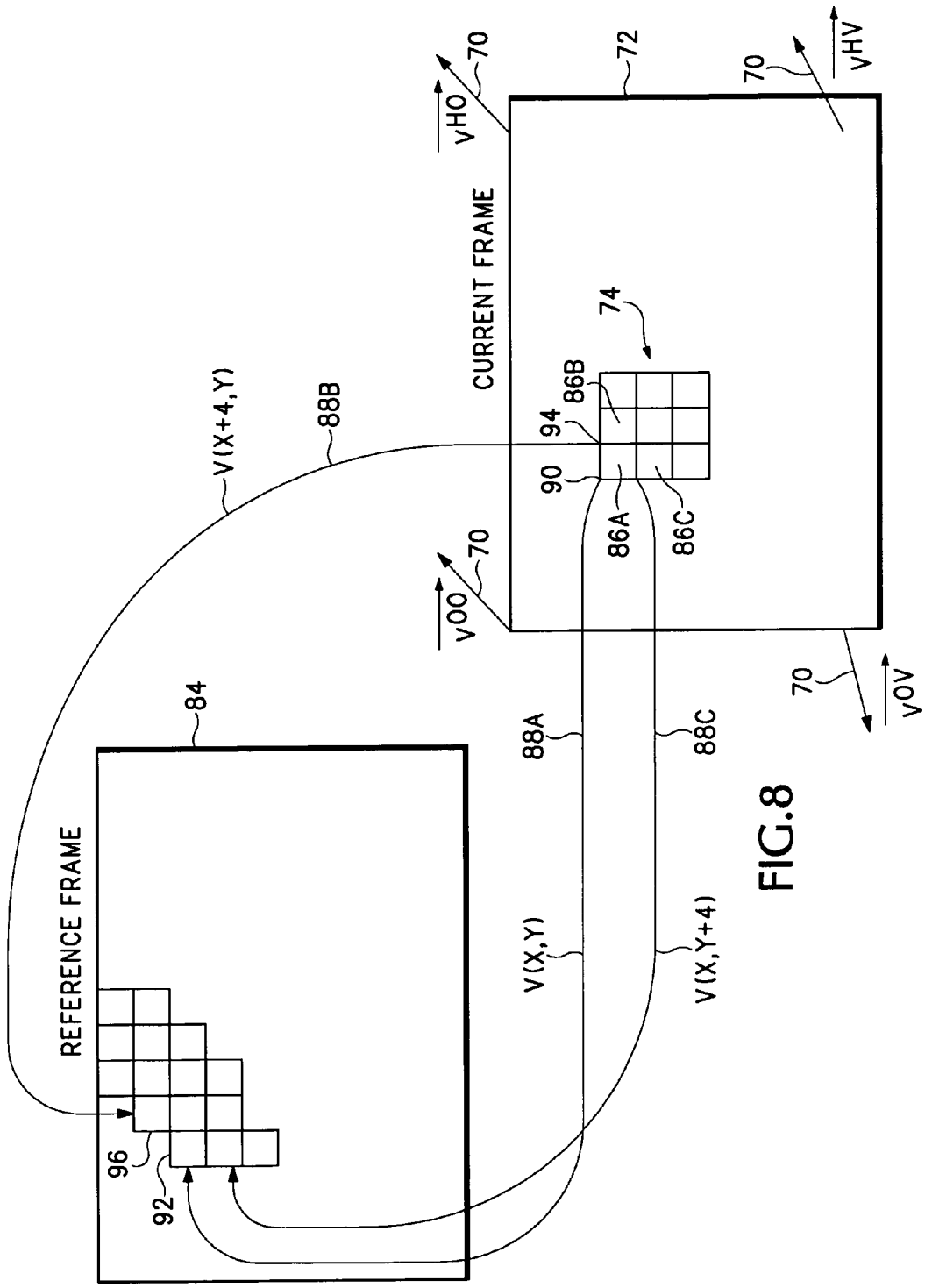
FIG. 8 is a diagram showing how local motion vectors are used to reconstruct subblocks during GMVC.

FIG. 8 shows how GMVC can encode 4×4 subblocks 86 in the same MB 74. In this example, the subblocks are 4×4 arrays of pixels. However the MBs and subblocks can be any size. Local motion vectors 88 are derived for each individual subblock 86 in MB 74 using Eq. 1. For example, a local motion vector for subblock 86A is derived by first identifying the x and y location 90 in the upper left hand corner. The global motion vectors 70 are then interpolated to the x and y location 90 using equation 1 to derive local motion vector 88A.

The local motion vector 88A points to subblock 92 in reference frame 84. The reference subblock 92 is then used to construct the image in subblock 86A. The other subblocks 86 in MB 74 are decoded in a similar manner. For example, the upper left corner of subblock 86B is at location 94 in image frame 72. If the subblocks are 4×4 pixel sizes, then subblock 86B is at location (x+4, y) in relation to subblock 86A at location (x, y). The global motion vectors 70 are interpolated to pixel location (x+4, y) using Eq. 1 to derive the local motion vector 88B. The local motion vector 88B is then used to identify reference subblock 96 in reference frame 84. The image information in subblock 96 is then used to reconstruct the image for subblock 86B in the current image frame 72. A similar process is conducted for the other subblocks 86 in MB 74.

As shown in Table 2 of FIG. 5, there are two GMVC modes for the macroblock.

First is the GMVC_COPY mode. This is similar to the "skip" or "copy" mode used in current video coding standards. The traditional "copy" mode indicates a macroblock that is a direct "copy" of the macroblock at the same location in the current reference frame. The difference in "GMVC_COPY" is that the "copy" of each motion compensated block in the GMVC_COPY mode will follow the motion vectors derived by Eq. (1). There is no conventional "copy" mode once the GMVC_flag is "on" for an image frame.

The second GMVC mode is GMVC_16 mode. If a macroblock is GMVC_16 mode, then only the residual transform coefficients are coded into the bit stream. The local motion vectors for that macroblock will be derived from Eq. (1). The difference between the reference frame macroblock pointed to by the local motion vector and the current macroblock is encoded as the residual transform coefficients.

In the current TML syntax, the "copy" mode is replaced by the "GMVC_COPY" mode for GMVC frames and a new mode "GMVC_16" is added to the other possible coding modes for GMVC frames. For all the non-GMVC modes in the GMVC frame, local motion vectors are coded explicitly into the bit stream as previously shown in FIG. 2.

It is not necessary to code the "COPY" or "GMVC_COPY" mode explicitly. Run-length coding can be used to increase coding efficiency. Instead of generating a copy codeword for each MB in a string of CMVC_COPY mode MBs, the number of MBs that are GMVC_COPY mode can be signaled before each non-GMVC_COPY MB.

When camera motion is present in a video sequence, the number of GMVC_COPY MBs tends to be larger then in convention COPY MB in the original TML bit stream. Thus, more bit savings are realized when run-length coding is implemented for the "GMVC_COPY" mode. Since GMVC modes tend to give true motion vectors, which are more correlated than that without GMVC modes, the visual quality and coding efficiency of image frames are also improved.

FIG. 9 shows a block diagram of an encoder and decoder that implement the GMVC scheme. The encoder and decoder can be implemented in any programmable processor device or in discrete circuitry. The GMVC scheme can be used for any image application such as video phones, cameras, video cameras, television, streaming video applications or in any other applications where image data is encoded or decoded.

The encoder 99 receives image frames from an input video source 100. Other than boxes 122 and 124 the encoder circuitry is similar to prior encoders. The image frames are transformed in box 104, such as with a Discrete Cosine Transform. The image frames are quantized in box 106 and then variable length coded in box 108. The output of box 108 is encoded image data.

The quantized image frames are inverse quantized in box 110 and inverse transformed in box 112. A loop filter is applied in box 116 and the resulting reference frames are stored in frame buffer 118. Block motion estimation is performed in block 120 by comparing the current image frame with a current reference frame. The block motion estimation 120 generates local motion vectors that are encoded along with any residuals generated from comparator 102.

Global motion parameters are estimated in box 122 and used by a block motion decision box 124 to determine whether GMVC coding is used for particular image frames. If GMVC coding is used, the global motion parameters estimated in box 122 are added to the encoded bit stream 109 along with the code words that indicate which coding mode is used for the MBs.

The decoder 130 performs variable length decoding in box 132 and inverse quantization in box 134. An inverse transform in box 136 outputs the inverse transformed bit stream to an adder circuit 138. Reference frames in frame buffers 144 are also supplied to the adder 138 and are used in combination with the output from inverse transform 136 to reconstruct the current image frame. The output from adder 138 is passed through a loop filter in box 140 and then output as decoded video in box 142.

A block motion decision box 146 in the decoder decides if GMVC is performed on particular MBs in particular image frames based on the GMVC_flag 44 and GMVC mode 50 (FIG. 3) generated by block motion decision block 124.

Test Results

FIG. 10 shows the results of tests conducted mainly following the "Simulation Conditions" specified in VCEG-M75 described by Gisle Bjontegaard, "Recommended Simulation Conditions for H.26L," document VCEG-M75, ITU-T Video Coding Experts Group (VCEG) Meeting, Austin, Tex., USA, Apr. 2–4, 2001.

The global motion vector coding scheme is integrated into the TML-8 software to compare against the TML-8 codec. The 300-frame CIF-format "coast-guard" sequence was added to the testing set to demonstrate the advantage of the proposed GMVC technique. The motion search range parameter is set to 16 and the RD optimization option is turned off.

For sequences with global motions or camera motions, such as "foreman", "mobile", "tempete", and "coast-guard", significant bit savings were produced especially in the low-bit-rate cases when Quantization Parameter (QP) values are high. For example, when QP is 28, the bit saving for "foreman" is 11.4%; the bit saving for "mobile" is 10.2%; the bit saving for "tempete" is 8.1%; and the bit saving for "coast-guard" is 19.5%. Since the motion vector coding becomes less significant part of the whole bit stream at high bit rates, GMVC delivers bit rate and video quality very similar to the original TML-8 codec when QP values are lower.

In the original TML codec, the conventional "copy" mode introduces annoying artifacts when global motion is present in the scene. With the GMVC technique, these artifacts are significantly removed. The GMVC technique gives significant benefit for low-bit-rate video coding by reducing bit rate and enhancing visual quality. The GMVC scheme is especially useful for video applications in the mobile environments where there is large amounts of global or camera motion. Only one bit per frame is required to enable or disable the GMVC scheme when GMVC is not used. Thus, the overhead for coding efficiency is negligible. The GMVC scheme also does not add significant coding complexity to either the encoder or decoder.

The system described above can use dedicated processor systems, micro controllers, programmable logic devices, or microprocessors that perform some or all of the operations. Some of the operations described above may be implemented in software and other operations may be implemented in hardware.

For the sake of convenience, the operations are described as various interconnected functional blocks or distinct software modules. This is not necessary, however, and there may be cases where these functional blocks or modules are equivalently aggregated into a single logic device, program or operation with unclear boundaries. In any event, the functional blocks and software modules or described features can be implemented by themselves, or in combination with other operations in either hardware or software.

Having described and illustrated the principles of the invention in a preferred embodiment thereof, it should be apparent that the invention may be modified in arrangement and detail without departing from such principles. Claim is made to all modifications and variation coming within the spirit and scope of the following claims.

What is claimed is:

1. A method for coding or decoding an image, comprising:
providing an encoded macroblock bit stream that includes global motion parameters associated with a current image frame;
deriving local motion vectors from the global motion parameters in the encoded macroblock bit stream for individual macroblocks in the current image frame;
using bilinear interpolation to derive the local motion vectors from the global motion parameters in the encoded macroblock bit stream;
using the local motion vectors to identify reference blocks in a reference frame without generating or modifying the reference frame; and
using the identified reference blocks to encode or decode the macroblocks in the current image frame.

2. A method according to claim 1 including:
identifying four global motion vectors associated with corners of the current image frame: and
generating the local motion vectors by using bilinear interpolation to interpolate the four global motion vectors to locations of the macroblocks in the current image frame.

3. A method according to claim 1 including deriving local motion vectors from the global motion parameters for individual macroblocks in the current image frame independently of types of local motion vectors or global motion vectors derived for other macroblocks in the current image frame.

4. A method according to claim 1 including:
using the derived local motion vectors to identify reference blocks in the reference frame that are substantially the same as the macroblocks in the current image frame; and
encoding the macroblocks as copy type macroblocks that are decoded by copying the identified reference blocks into the macroblocks.

5. A method according to claim 4 including:
identifying residuals between the reference blocks and the macroblocks; and
encoding only the residuals for the macroblocks.

6. A method according to claim 1 including:
deriving the local motion vectors as follows:

$$\underline{v}(x, y) = \underline{r}^0 + \left(\frac{x}{H-a}\right)\underline{r}^x + \left(\frac{y}{V-a}\right)\underline{r}^y + \left(\frac{x}{H-a}\right)\left(\frac{y}{V-a}\right)\underline{r}^{xy}$$

where $v^{00}$, $v^{H0}$, $v^{0V}$, and $v^{HV}$ represent the global motion vectors at four corners of the current image frame, (0,0), (H−a, 0), (0, V−a), and (H−a, V−a), respectively; a represents the pixel subblock size; x and y represent an upper-left pixel location for the macroblock; and $\underline{r}^0$, $\underline{r}^x$, $\underline{r}^y$, and $\underline{r}^{xy}$ are the following:
$\underline{r}^0 = \underline{v}^{00}$
$\underline{r}^x = \underline{v}^{H0} - \underline{v}^{00}$
$\underline{r}^y = \underline{v}^{0V} - \underline{v}^{00}$
$\underline{r}^{xy} = \underline{v}^{00} - \underline{v}^{H0} - V^{0V} + \underline{v}^{HV}$.

7. A method according to claim 1 including:
generating subblock local motion vectors for individual subblocks in same macroblocks using the global motion parameters;
identifying individual reference subblocks in the reference frame pointed to by the subblock local motion vectors; and
separately encoding and decoding the subblocks using the identified reference subblocks.

8. The method according to claim 1 wherein the local motion vectors are derived from the global motion parameters as follows:
providing global motion parameters vectors for four corners of the current image frame;
interpolating the global motion parameters to a pixel location associated with the macroblock;
using a result of the interpolation to identify a location in the reference frame; and
using contents of the reference frame at the identified location to generate image data for the macroblock.

9. A method for coding or decoding an image, comprising:
providing global motion parameters associated with a current image frame;
deriving local motion vectors from the global motion parameters for individual macroblocks in the current image frame;
using the local motion vectors to identify reference blocks in a reference frame;
using the identified reference blocks to encode or decode the macroblocks in the current image frame; and
deriving the local motion vectors from the global motion parameters as follows:

$$\underline{v}(x, y) = \underline{r}^0 + \left(\frac{x}{H-a}\right)\underline{r}^x + \left(\frac{y}{V-a}\right)\underline{r}^y + \left(\frac{x}{H-a}\right)\left(\frac{y}{V-a}\right)\underline{r}^{xy} \quad (1)$$

where $v^{00}$, $v^{H0}$, $v^{0V}$, and $v^{HV}$ represent the global motion parameters at four corners of the current image frame, (0,0), (H−4, 0), (0, V−4), and (H−4, V−4), respectively; x and y represent an upper-left pixel location for the macroblock; and $\underline{r}^0$, $\underline{r}^x$, $\underline{r}^y$, and $\underline{r}^{xy}$ are the following:
$\underline{r}^0 = \underline{v}^{00}$
$\underline{r}^x = \underline{v}^{H0} - \underline{v}^{00}$
$\underline{r}^y = \underline{v}^{0V} - \underline{v}^{00}$
$\underline{r}^{xy} = \underline{v}^{00} - \underline{v}^{H0} - V^{0V} + \underline{v}^{HV}$.

10. A method for coding or decoding an image, comprising:
receiving an encoded bit stream including macroblocks identified as global motion vector coded and either copy type or residual type;
receiving no local vectors in the encoded bit stream for the macroblocks identified as global motion vector coded;
using bilinear interpolation to derive local motion vectors for individual macroblocks only from global motion parameters in the encoded bit stream and independently of types of local motion vectors or global motion vectors used for other macroblocks in a current image frame;
using the derived local motion vectors to identify reference blocks in a reference frame;
copying the identified reference blocks for the copy type macroblocks; and
adding encoded residuals to the identified reference blocks for the residual type macroblock; and
using the identified reference blocks to encode or decode the macroblocks in the current image frame.

11. A decoder, comprising:
an input receiving encoded image frames wherein a common set of global motion estimation parameters are included in the encoded image frames for identified macroblocks and no local motion vectors are included in the encoded image frames for the identified macroblocks;
decoding logic circuitry deriving local motion vectors for the identified individual macroblocks from the global motion estimation parameters independently of types of local motion vectors or global motion vectors used for other adjacent macroblocks in the encoded image frames, the decoding logic circuitry using the derived local motion vectors to identify reference blocks in a current reference frame; and
adding logic circuitry combining the reference blocks to reconstruct the identified macroblocks in a current frame;
wherein said decoding logic circuitry generates the local motion vectors by bilinearly interpolating the global motion estimation parameters to locations of the macroblocks in the current frame.

12. A decoder according to claim 11 wherein the decoding logic circuitry detects code words included along with the encoded image frames that identify global motion vector coded macroblocks that do not have associated local motion vectors in the encode image frames.

13. A decoder according to claim 12 wherein the code words indicate when the macroblocks are a direct copy of the reference blocks.

14. A decoder according to claim 12 wherein the code words indicate when residuals are added to the reference blocks to reconstruct the macroblocks.

15. A decoder according to claim 10 wherein the decoding logic circuitry uses the global motion estimation parameters to generate local motion vectors for different subblocks, the decoding logic circuitry using the local motion vectors to identify different reference subblocks in the current reference frame and then using the identified reference subblocks to reconstruct the subblocks in the current frame.

16. A decoder according to claim 11 wherein a processor comprises the input, the decoding logic circuitry and the adding logic circuitry.

17. An encoder, comprising:
encoding logic circuitry encoding an image frame by encoding a set of global motion estimation parameters for an image frame, the encoding logic circuitry identifying macroblocks in the image frame in which local motion vectors associated with the identified macroblocks are derivable from the global motion estimation parameters in an encoded macroblock bit stream using bilinear interpolation, and not encoding local motion vectors associated with the identified macroblocks;
adding logic circuitry to combine the identified macroblocks into the encoded macroblock bit stream.

18. An encoder according to claim 17 wherein the local motion vectors are used to identify locations in a reference frame that are used to generate images for the identified macroblocks without the global motion estimation parameters generating or modifying the reference frame.

19. An encoder according to claim 17 wherein the encoding logic circuitry compares the global motion estimation parameters with block motion estimation parameters to determine which macroblocks use the local motion vectors derived from the global motion estimation parameters.

20. An encoder according to claim 17 wherein the encoding logic circuitry generates codewords that identify the macroblocks that derive the local motion vectors only from the global motion estimation parameters.

21. An encoder according to claim 17 wherein the encoding logic circuitry identifies macroblocks that are directly copied from reference blocks pointed to by the local motion vectors derived from the global motion estimation parameters.

22. An encoder according to claim 17 wherein the encoding logic circuitry encodes residuals for the identified macroblocks but no local motion vectors.

23. An encoder according to claim 17 wherein the encoding logic circuitry performs run length coding on the encoded image frame.

24. An encoder according to claim 17 wherein the macroblocks are N×N pixel arrays, where N is an integer; subblocks are M×M pixel arrays, where M is an integer less than or equal to N.

25. An encoder according to claim 17 wherein a processor comprises the encoding logic circuitry and the adding logic circuitry.

26. A computer readable medium containing computer executable instructions, the instructions when executed:
processing encoded image frames wherein a common set of global motion estimation parameters are included in the encoded image frames for identified macroblocks and no local motion vectors are included in the encoded image frames for the identified macroblocks,
deriving local motion vectors for identified individual macroblocks from the global motion estimation parameters independently of types of local motion vectors or global motion vectors used for other adjacent macroblocks in the encoded image frames,
using the derived local motion vectors to identify reference blocks in a current reference frame, and
using the reference blocks to reconstruct the identified macroblocks in a current frame;
wherein deriving the local motion vectors further includes bilinearly interpolating the global motion estimation parameters to locations of the macroblocks in the current frame.

27. The computer readable medium of claim 26 further including detecting code words included along with the encoded image frames that identity global motion vector coded macroblocks that do not have associated local motion vectors in the encode image frames.

28. The computer readable medium of claim 27 wherein the code words indicate when the macroblocks are a direct copy of the reference blocks.

29. The computer readable medium of claim 27 wherein the code words indicate when residuals are added to the reference blocks to reconstruct the macroblocks.

* * * * *